June 15, 1965 P. D. JONES 3,189,845
INVERTER CIRCUITS FOR PRODUCING AN A.C. OUTPUT FROM
A D.C. SOURCE USING SEMI-CONDUCTOR
CONTROLLED RECTIFIERS
Filed Nov. 5, 1962
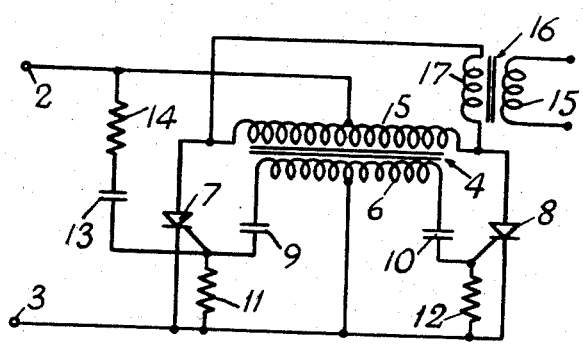

3,189,845
INVERTER CIRCUITS FOR PRODUCING AN A.C. OUTPUT FROM A D.C. SOURCE USING SEMI-CONDUCTOR CONTROLLED RECTIFIERS
Peter David Jones, Hodgehill, Castle Bromwich, Birmingham, England, assignor to Joseph Lucas (Industries) Limited, Birmingham, England
Filed Nov. 5, 1962, Ser. No. 235,266
Claims priority, application Great Britain, Nov. 22, 1961, 41,736/61
4 Claims. (Cl. 331—113)

The object of this invention is to provide an inverter in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674.

An inverter in accordance with the invention comprises in combination first and second terminals adapted for connection to a D.C. source, a saturable core, first and second windings on the core and having points intermediate their ends connected to the first and second terminals respectively, a pair of switchable rectifiers through the anodes and cathodes of which the ends of the first winding are connected to the second terminal respectively, a pair of capacitors through which the ends of the second winding are connected to the gates of the switchable rectifiers respectively, a pair of resistors through which the gates of the switchable rectifiers are connected to the second terminal respectively, and an output winding associated with the core, the arrangement being such that when the core is being magnetised in one direction one of the switchable rectifiers is switched on and the other is switched off, but when the core is saturated the conductivities of the switchable rectifiers are reversed and the core is magnetised in the opposite direction, so that an A.C. signal is produced in said output winding.

The accompanying drawing is a circuit diagram illustrating one example of the invention.

Referring to the drawing, there are provided first and second terminals, 2, 3, adapted for connection to a D.C. source so as to be of relatively positive and negative polarity respectively in use. There is further provided a saturable core 4 having thereon first and second windings 5, 6, the midpoints of which are connected respectively to the terminals 2, 3, so that each winding is divided into first and second parts. The core is formed from material having square loop characteristics.

The ends of the winding 5, are connected to the terminal 3 through the anodes and cathodes of first and second switchable rectifiers 7, 8 respectively, the gates of these rectifiers being connected to the ends of the winding 6 through first and second capacitors 9, 10, respectively, and to the terminal 3 through resistors 11, 12 respectively.

In order to commence operation of the apparatus, the gate of the switchable rectifier 7 is connected through a capacitor 13 and a resistor 14 in series to the terminal 2, thereby rendering the rectifier 7 conductive. Current now flows between the terminals 2, 3, through the rectifier 7 and the first part of the winding 5. The resultant voltages developed across the second parts of the winding 5, 6, ensure that the rectifier 8 is switched off.

When the core 4 is saturated no further induced voltages appear in the windings 5, 6. The resulting fall in voltage across the first part of the winding 6 causes a negative pulse to be supplied through the capacitor 9 to switch off the rectifier 7, and similarly a positive pulse is supplied to switch on the rectifier 8. The current flow is now through the rectifier 8 and the second part of the winding 5 and the core 4 is magnetised in the opposite direction. In this case, the rectifiers 7, 8 are held off and on respectively until the core is saturated in the opposite direction. The cycle is then repeated.

The output from the inverter may be taken from a coil surrounding the first winding, but larger powers may be obtained if, as shown, the output is taken from the secondary winding 15 of a transformer 16 having the ends of its primary winding 17 connected to the anodes of the switchable rectifiers 7, 8 respectively. The advantage of using a separate transformer for increasing power is that the second transformer need not have a square-loop core, which is relatively expensive.

Having thus described my invention what I claim as new and desire to secure by Letters Patent is:

1. An inverter comprising in combination a D.C. source, first and second terminals connected to the D.C. source, a saturable core, first and second windings on the core and having points intermediate their ends connected to the first and second terminals respectively, a pair of switchable rectifiers through the anodes and cathodes of which the ends of said first winding are connected to the second terminal respectively, each of said switchable rectifiers being switched on by a positive pulse applied between its gate and cathode, and being switched off by a negative pulse applied between its gate and cathode, a pair of capacitors through which the ends of the second winding are connected to the gates of the switchable rectifiers respectively, a pair of resistors through which the gates of the switchable rectifiers are connected to the second terminal respectively and an output winding associated with said core, conduction of one of said switchable rectifiers serving to magnetise the core in one direction and maintain the other switchable rectifier non-conductive, and saturation of said core resulting in reversing the conductivities of said switchable rectifiers so that the core is magnetised in the opposite direction, an A.C. signal being produced in said output winding.

2. An inverter as claimed in claim 1 in which said saturable core is formed of substantially square loop material.

3. An inverter as claimed in claim 1 including a transformer having a primary winding and a secondary winding, said secondary winding constituting the output winding, and the ends of said primary winding being connected to the anodes of said switchable rectifiers respectively.

4. An inverter as claimed in claim 1 including means connected between one of said terminals and the gate of one of said switchable rectifiers for rendering said one switchable rectifier conductive to commence operation of the inverter.

References Cited by the Examiner
UNITED STATES PATENTS
2,916,704  12/59  Morey _____ 331—113

ROY LAKE, Primary Examiner.
JOHN KOMINSKI, Examiner.